United States Patent
Chandramouli et al.

(10) Patent No.: US 11,932,320 B2
(45) Date of Patent: Mar. 19, 2024

(54) RADIO-ACCESS-TECHNOLOGY-SPECIFIC ACCESS RESTRICTIONS

(71) Applicant: NOKIA SOLUTIONS AND NETWORKS OY, Espoo (FI)

(72) Inventors: Devaki Chandramouli, Plano, TX (US); Rainer Liebhart, Munich (DE); Tsunehiko Chiba, Saitama (JP)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/693,695

(22) Filed: Mar. 14, 2022

(65) Prior Publication Data

US 2022/0194493 A1 Jun. 23, 2022

Related U.S. Application Data

(63) Continuation of application No. 15/927,173, filed on Mar. 21, 2018, now abandoned.

(60) Provisional application No. 62/474,355, filed on Mar. 21, 2017.

(51) Int. Cl.
| | |
|---|---|
| *H04W 48/16* | (2009.01) |
| *B62D 37/06* | (2006.01) |
| *B62D 63/02* | (2006.01) |
| *H04W 60/00* | (2009.01) |
| *B60K 8/00* | (2006.01) |
| *H01F 7/06* | (2006.01) |
| *H01F 7/14* | (2006.01) |

(52) U.S. Cl.
CPC .............. *B62D 37/06* (2013.01); *B62D 63/02* (2013.01); *H04W 48/16* (2013.01); *H04W 60/00* (2013.01); *B60K 8/00* (2013.01); *B60Y 2200/11* (2013.01); *H01F 7/06* (2013.01); *H01F 7/145* (2013.01)

(58) Field of Classification Search
CPC ...................................................... H04W 48/16
USPC ......................................................... 455/435.2
See application file for complete search history.

(56) References Cited

U.S. PATENT DOCUMENTS

| | | | |
|---|---|---|---|
| 9,179,402 B2 | 11/2015 | Tsai et al. | |
| 2007/0223424 A1 | 9/2007 | Su et al. | |
| 2011/0103277 A1* | 5/2011 | Watfa | H04W 36/0033 370/310 |
| 2013/0012260 A1 | 1/2013 | Salkintzis et al. | |
| 2013/0044709 A1 | 2/2013 | Adjakple et al. | |

(Continued)

OTHER PUBLICATIONS

3GPP TR 38.801 V1.0.0 (Dec. 2016), 3rd Generation Partnership Project; Technical Specification Group Radio Access Network; Study on New Radio Access Technology; Radio Access Architecture and Interfaces (Release 14), Dec. 2016.

(Continued)

*Primary Examiner* — Joel Ajayi
(74) *Attorney, Agent, or Firm* — SQUIRE PATTON BOGGS (US) LLP (57) ABSTRACT

Various communication systems may benefit from appropriate restriction on use. For example, certain wireless communication systems may benefit from radio-access-technology-specific access restrictions. A method can include registering a user equipment with a network element. The registering can include identifying user equipment capabilities. The method can also include receiving a response from the network element indicating restriction on use of at least one radio access technology.

12 Claims, 7 Drawing Sheets

(56) References Cited

U.S. PATENT DOCUMENTS

| | | |
|---|---|---|
| 2013/0155965 A1 | 6/2013 | Koodli |
| 2016/0007316 A1* | 1/2016 | Vaidya ................ H04W 64/003 |
| | | 370/312 |
| 2017/0078928 A1 | 3/2017 | Kiss |
| 2017/0105150 A1* | 4/2017 | Olsson ................. H04W 36/14 |

OTHER PUBLICATIONS

3GPP TS 22.011 V14.4.0 (Dec. 2016), 3rd Generation Partnership Project; Technical Specification Group Services and System Aspects; Service accessibility (Release 14), Dec. 2016.

3GPP TS 23.401 V14.2.0 (Dec. 2016); 3rd Generation Partnership Project; Technical Specification Group Services and System Aspects; General Packet Radio Service (GPRS) enhancements for Evolved Universal Terrestrial Radio Access Network (E-UTRAN) access (Release 14), Dec. 2016.

3GPP TS 23.501 V0.1.1 (Jan. 2017); 3rd Generation Partnership Project; Technical Specification Group Services and System Aspects; System Architecture for the 5G System; Stage 2 (Release 15), Jan. 2017.

3GPP TR 23.799 V14.0.0 (Dec. 2016); 3rd Generation Partnership Project; Technical Specification Group Services and System Aspects; Study on Architecture for Next Generation System (Release 14), Dec. 2016.

Ericsson et al, S1-171184, Administrative restriction of subscribers' access to E-UTRAN with NR DC, 3GPP TSG-SA WG1 Meeting #77, Feb. 2017.

Jun. 4, 2018 Written Opinion and Search Report issued in International Patent Application No. PCT/EP2018/057159.

\* cited by examiner

RADIO-ACCESS-TECHNOLOGY-SPECIFIC ACCESS RESTRICTIONS

CROSS-REFERENCE TO RELATED APPLICATION

This application is a continuation of U.S. patent application Ser. No. 15/927,173 filed on Mar. 21, 2018 which claims the benefit and priority of U.S. Provisional Patent Application No. 62/474,355 filed Mar. 21, 2017. The contents of these applications are hereby incorporated by reference.

BACKGROUND

Field

Various communication systems may benefit from appropriate restriction on use. For example, certain wireless communication systems may benefit from radio-access-technology-specific access restrictions.

Description of the Related Art

Evolved packet system (EPS) is a successor of the general packet radio system (GPRS). EPS provides a long term evolution (LTE) radio interface and evolved packet core (EPC) network functions for broadband wireless data access. Such EPS core network functions include the mobility management entity (MME), packet data network gateway (P-GW) and serving gateway (S-GW).

Figure 1:
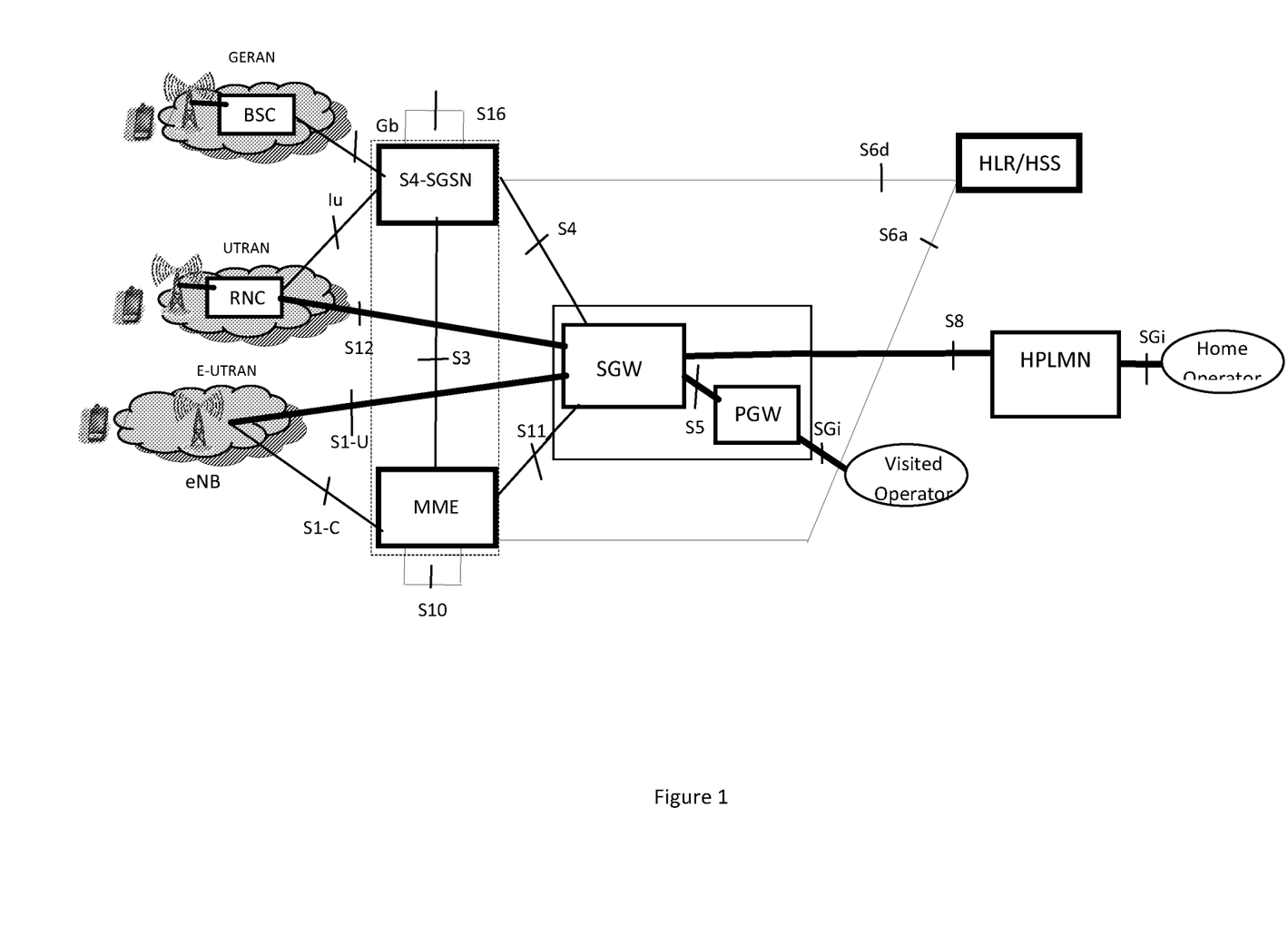
FIG. 1 illustrates an evolved packet core architecture.

FIG. 1 illustrates an evolved packet core architecture, as described by 3GPP TS 23.401. A common packet domain core network can be used for both radio access networks (RAN) the global system for mobile communication (GSM) enhanced data rates for GSM evolution (EDGE) radio access network (GERAN) and the universal terrestrial radio access network (UTRAN). This common core network provides GPRS services.

Fifth generation (5G) is the new generation of radio systems and network architecture delivering extreme broadband and ultra-robust, low latency connectivity and massive machine-to-machine connectivity for the Internet of Things (IoT) to enable the programmable world.

5G systems may be used in at least three use cases. In a first use case, massive broadband can be used to deliver gigabytes of bandwidth in uplink and downlink per second on demand. In a second use case, critical machine-type communication can allow for immediate (for example, with extreme low end to end (e2e) latency), synchronous eye-hand feedback that permits remote control of robots and cars. In a third use case, massive machine-type communication can connect billions of sensors and machines.

The biggest difference between fourth generation (4G) and 5G design requirements is the diversity of use-cases that 5G networks may be required support as compared to 4G networks that were primarily designed for the single use-case of delivering high speed mobile broadband in 3GPP rel-8.

5G may not only be a new radio access technology (RAT) family, but its architecture may expand to multiple dimensions by providing a common core for multiple radio technologies, such as cellular, Wi-Fi, and fixed, as well as for multiple services, such as IoT, mobile broadband, and low latency-high reliability, and further for multiple network and service operators.

Figure 2:
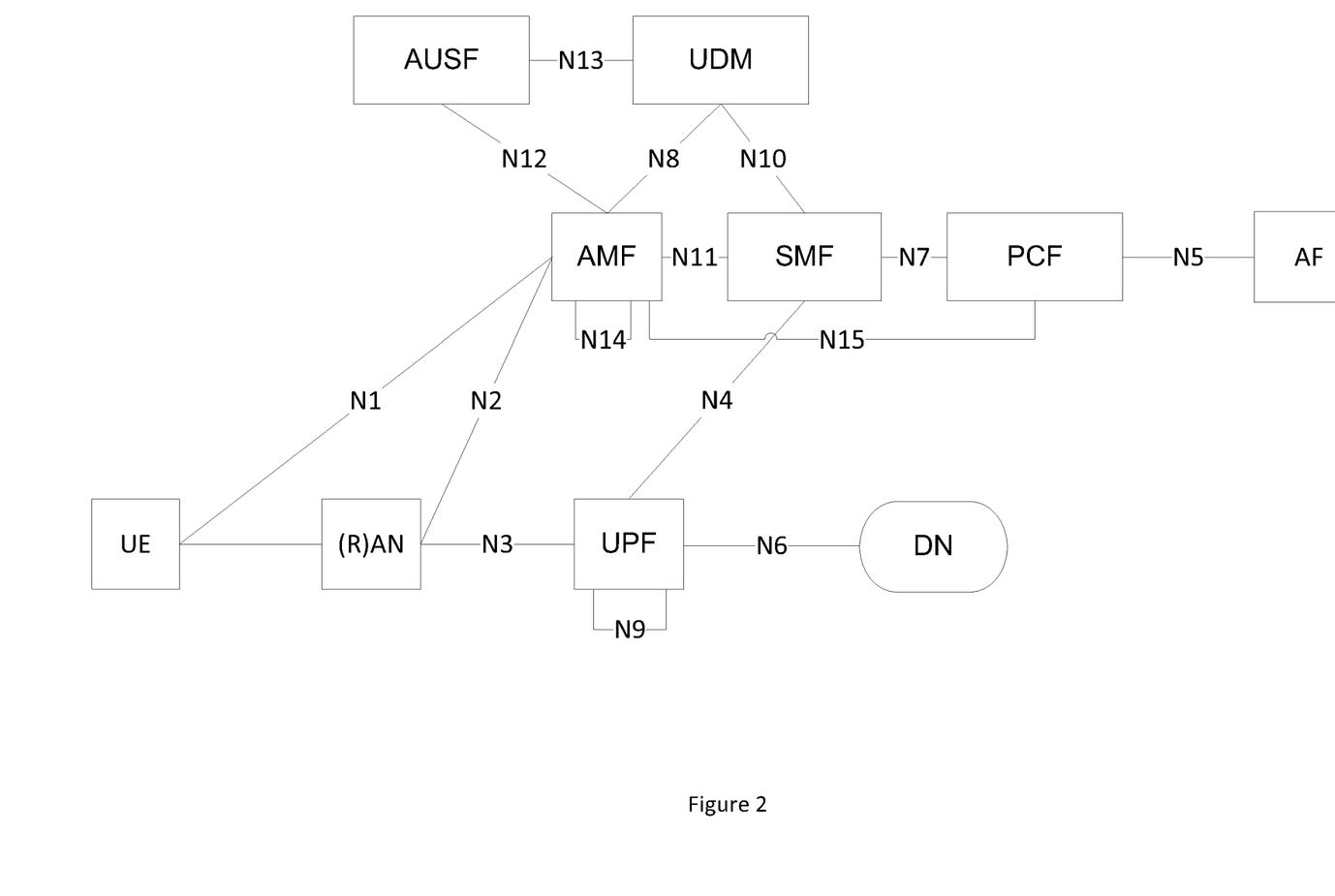
FIG. 2 illustrates a non-roaming next generation system architecture

FIG. 2 illustrates a non-roaming next generation system architecture, as described by 3GPP TS 23.501 v0.1.1. For introducing 5G, 3GPP has discussed different architecture and interworking options. One option called option 3/3a/3x is a non-standalone (NSA) option that anchors the 5G base station (5G Node B or gNB) in dual connectivity mode at the LTE eNB, which is connected to the EPC. RRC connection is always between UE and eNB, user plane however can traverse 5G NB and is either forwarded to eNB (in a split bearer option) or directly to the serving gateway (S-GW) in EPC with secondary cell group (SCG) bearer option using the S1-U interface.

Figure 3:
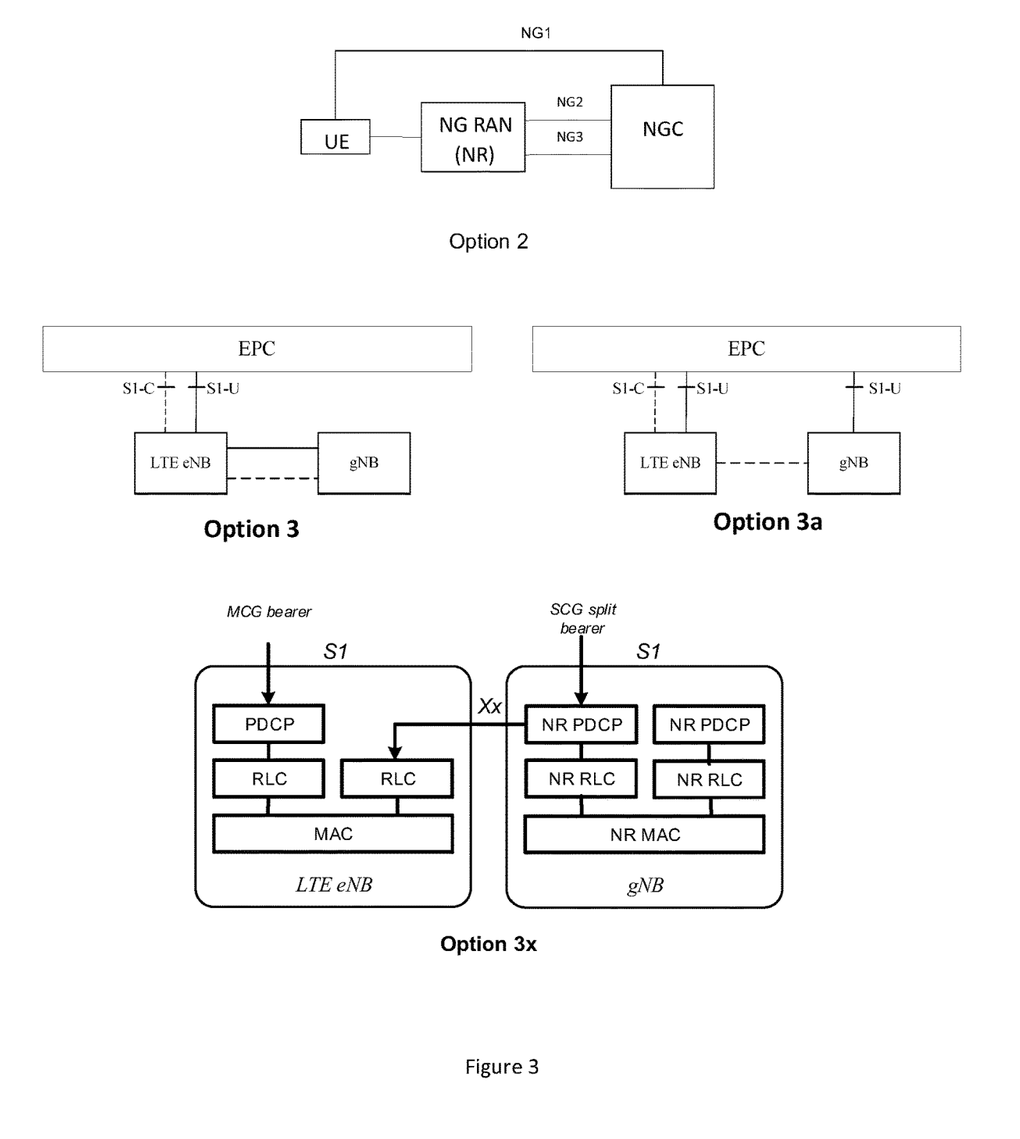
FIG. 3 illustrates options 2 and 3(a/x).
Figure 4:
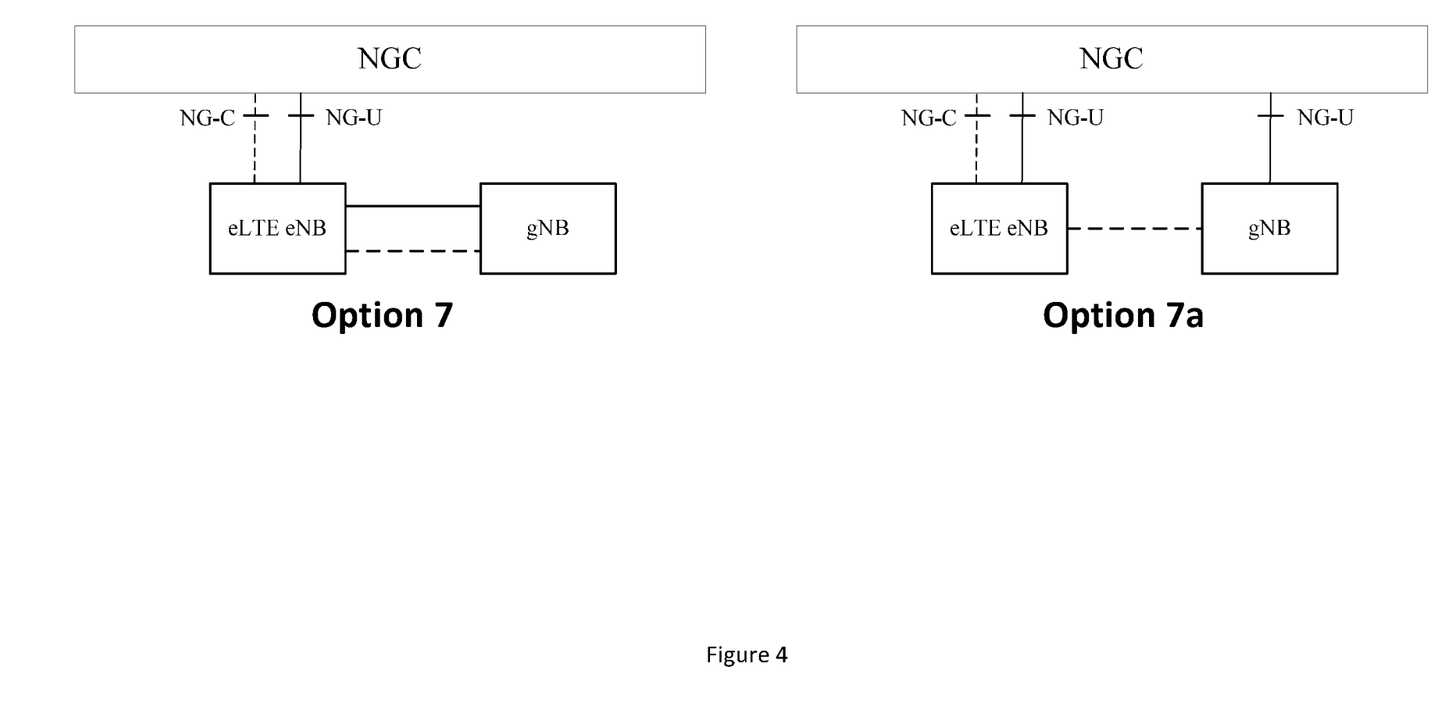

FIG. 3 illustrates options 2 and 3(a/x). FIG. 4 illustrates option 7/7a. Option 7/7a can be for the case in which the LTE eNB is anchored in dual connectivity mode at the 5G NB, which is connected to the new 5G core network (5G-CN). Architecture option 2, so called standalone (SA) option assumes that the 5G system is standalone in which 5G NB is connected to 5G-CN and has no dependency on LTE/EPC. EPC and 5GC can interwork in order to support inter system mobility/handover. It is also possible to connect an enhanced LTE eNB to the new 5GC, option 5. However 3GPP has ruled out the option in which the 5G NB connects to EPC. Architecture options 2, 3/3a/3x and 7/7a are shown in FIGS. 3 and 4. See also 3GPP TR 38.801/TR 23.799 for possible deployment options.

SUMMARY

According to a first embodiment, a method can include registering a user equipment with a network element, wherein the registering comprises identifying user equipment capabilities. The method can also include receiving a response from the network element indicating restriction on use of at least one radio access technology.

In a variation, the network element can be a mobility management entity.

In a variation, the capabilities can be provided via S1 or non-access stratum signaling.

In a variation, the response can be a tracking area update acceptance message or attach acceptance message.

In a variation, the capabilities can be capabilities for using a plurality of radio access technologies.

In a variation, the method can further include disabling at least one radio access technology for the user equipment based on the response.

According to a second embodiment, a method can include receiving a registration request for a user equipment at a network element, wherein the request identifies user equipment capabilities; determining a restriction on use of at least one radio access technology for the user equipment; and at least one of sending a response to the user equipment indicating the restriction on use of at least one radio access technology, or indicating to an access node that the access node is to impose at least one restriction on serving at least one radio access technology to the user equipment.

In a variation, the network element can be a mobility management entity.

In a variation, the method can further include obtaining subscription information regarding the user equipment from a further network element, wherein the restriction on use is determined based on the subscription information.

In a variation, the restriction on use can be determined further based on roaming information regarding the user equipment.

In a variation, the further network element can be a home subscriber server or unified data manager.

In a variation, the capabilities can be provided via S1 or non-access stratum signaling.

In a variation, the response can be a tracking area update acceptance message or attach acceptance message.

In a variation, the access node can be an evolved Node B or a next generation Node B.

In a variation, the capabilities can be capabilities for using a plurality of radio access technologies.

In a variation, the determination can be further based on a timer related to use of at least one radio access technology.

In a variation, the determination can be further based on access control validity information related to use of at least one radio access technology.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein:

FIG. 4 illustrates option 7/7a.

DETAILED DESCRIPTION

The above-described different architecture options, especially options 3/3a/3x may create the following situation: if a 5G and LTE capable UE is trying to attach to a network where the NSA architecture option is deployed but has only a valid LTE subscription, it is currently not clear how access to 5G RAN is restricted while access to LTE is allowed. This is the case irrespective of whether the UE is trying to connect to its home public land mobile network (HPLMN) or is roaming in a visited public land mobile network (VPLMN). In general, a similar situation can also arise with other architecture options, for example with option 7/7a where the UE could have access to 5G but not to LTE or vice versa.

Certain embodiments provide a general solution for how to restrict access of a UE to certain RAT(s) based on roaming agreements and subscription profile, while other RAT(s) are forbidden either due to lack of subscription or lack of proper roaming agreements. The approach of certain embodiments may be applicable for roaming and non-roaming cases. For option 3x, there is a possibility for gNB to transfer all of the data to LTE eNB, which can eventually transmit the data towards the UE, instead of gNB transferring the data to the UE directly. In this case, the UE may be allowed to camp in the gNB serving are since over-the-air transmission does not use 5G spectrum but only LTE.

Thus, certain embodiments provide a solution to allow or restrict access for an LTE/5G capable UE to the network, irrespective of whether the UE is roaming or not and whether the user has only a valid LTE, 5G or combined LTE/5G subscription.

For example, a unified data management (UDM)/home subscriber server (HSS) subscription profile associated with a subscriber can contain information about the RAT(s) that are allowed to be used or not. For example, LTE allowed but 5G may be forbidden or LTE/5G may be allowed in HPLMN, but 5G may be forbidden in VPLMN, or any other combination of these. Then the corresponding system, EPS or next generation system (NGS) depending on the architecture option, can enforce subscription access when the UE is registering with the system and/or a certain session (for example, NSA NR—option 3/option 7) is being established for the given UE.

Specific examples are discussed below, but it should be understood that similar approaches can be applied to other combinations of RATs.

According to certain embodiments, a subscription restriction can be in place for Option 3. In this case, the following data can be stored in the HSS as part of the UE subscription to accommodate with the new architecture option 3: EN-NR DC with EPC allowed in HPLMN and list of other PLMNs (potential EPLMNs/VPLMNs); or EN-NR DC with EPC not allowed in HPLMN and list of other PLMNs (potential EPLMNs/VPLMNs). A parameter that can be used for such subscription information stored or transferred, for example, between the HSS and MME can be EPC_DC_NR_LTE. Other parameter names are also permitted.

Figure 5:
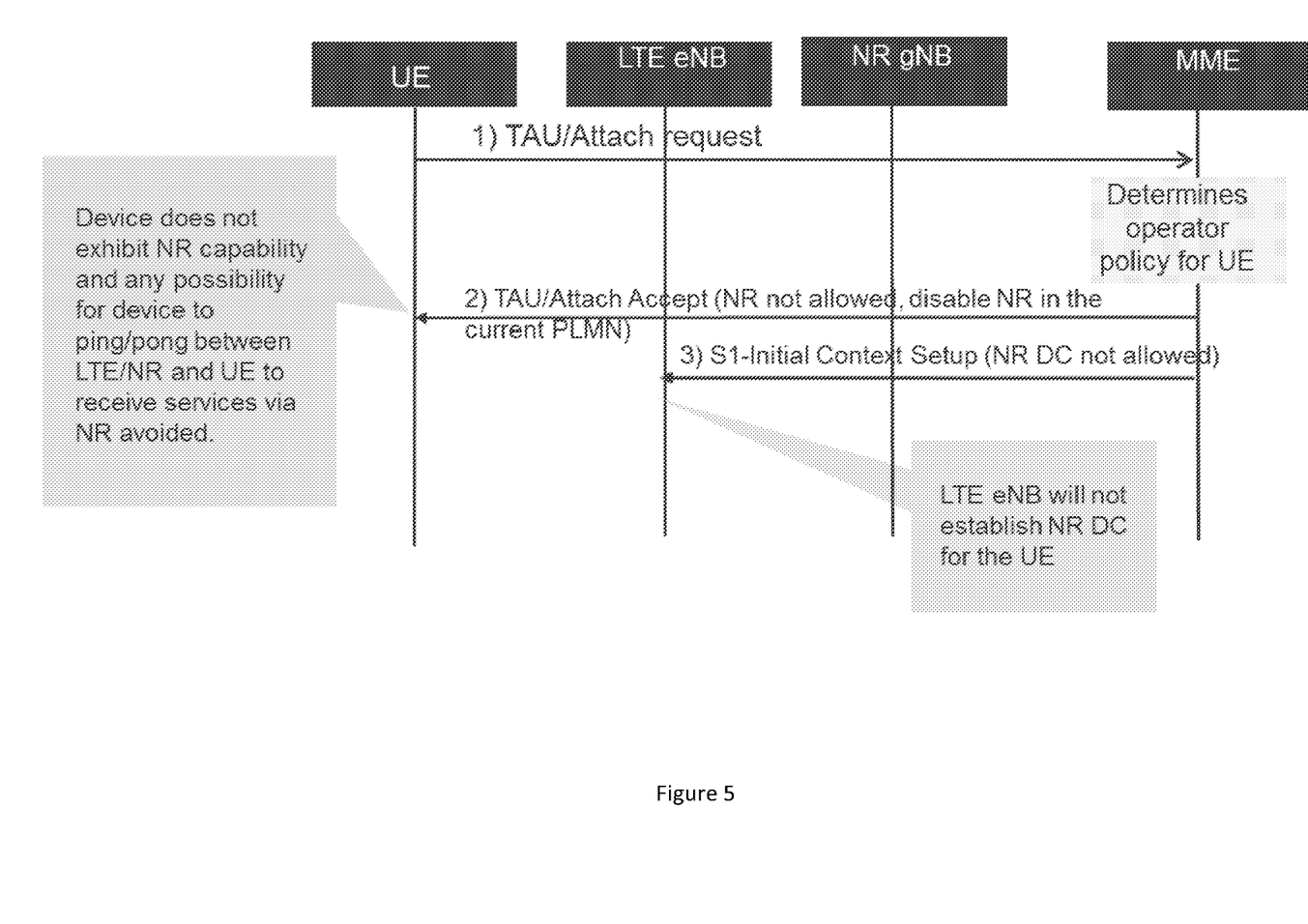
FIG. 5 illustrates a signal flow diagram of a method according to certain embodiments.

FIG. 5 illustrates a signal flow diagram of a method according to certain embodiments. As shown in FIG. 5, in this example a UE with 4G E-UTRAN and 5G NR capabilities can register with the MME in EPC and provide the UE's RAT capabilities at 1.

At the time of registration, the MME can receive UE capabilities either via S1 and/or via NAS signaling and can obtain UE subscription information from the HSS. Depending on the subscription information received from the HSS and possible roaming information stored in the MME, the MME can determine whether the UE is allowed to access 5G NR or not in the serving PLMN.

The MME can, at 2, directly indicate the RAT allowance or prohibition information to the UE as part of an Attach Accept/TAU accept and can request the UE to disable 5G NR in the serving network/PLMN. In addition, at 3 the MME can indicate to the LTE eNB that the eNB should not establish DC with NR for the given UE. This can, for example, more specifically indicate that the UE is not allowed to transmit and receive data via NR. Either 2 or 3 can ensure that 5G NR access is not allowed for the UE that does not have access to it.

Furthermore, in case of option 3x, the LTE eNB may provide further access control information to gNB so that the gNB can perform data forwarding only back to LTE eNB without transferring data towards the UE directly.

Specifically, in the case of option 3x, the LTE eNB can provide this information to the gNB as part of Secondary eNB (SeNB). An additional procedure may be to allow the gNB to forward data back to the LTE eNB, for example to prohibit using 5G spectrum for that UE. For option 3x, it is possible to offload the data processing to the gNB, which may perform packet data convergence protocol (PDCP)/radio resource management (RRM) functions.

According to certain embodiments, there can be subscription restriction for a 5G system. This alternative may encompass the other above-described architecture options, aside from option 3, such as options 2, 4, 5, and 7.

In this case, the following information may be stored in the UDM as part of the UE subscription to accommodate the new 5G system architecture: NGS system allowed, NGS system not allowed in HPLMN and list of other PLMNs (potential EPLMNs/VPLMNs), or NR-EN DC with NGS allowed in HPLMN and list of other PLMNs (potential EPLMNs/VPLMNs).

Based on the subscription information received from UDM and potentially roaming information stored at the AMF, the AMF can decide which RAT combination is allowed for the UE in the HPLMN or VPLMN and whether it is allowed to access NGC. When the UE performs initial registration in the AMF, it can reject the UE with an appropriate cause code, if the UE is not allowed to access NGS. If the UE is allowed to access NGS but not one of the radio accesses (5G NR or LTE), then it can indicate subscription restriction information as part of registration accept. Such indications can trigger the UE to disable NR and/or stop attempting to register in NGC in the current PLMN. To prevent UEs accessing via option 5, standalone E-UTRA accessing NGC, AMF can provide the appropriate cause code to UE to stop attempting to register in NGC in the current PLMN. Furthermore, AMF can provide "no access to NGC for the given UE" to E-UTRAN for the given UE and in this case, E-UTRAN can reject NGC access for the given UE by rejecting use of NR RRC or E-UTRAN RRC (with NGC NAS) request thus it redirects the UE to use E-UTRAN RRC (with EPC NAS) only in the serving network/PLMN.

Note: whether Option 5 UEs will use enhanced E-UTRAN RRC (with NGC NAS) or NR RRC (with NGC NAS) is still to be decided/confirmed in 3GPP RAN2.

In addition, access control information along with optional validity information (for example, to indicate how long the access control information is valid), can be sent from an access management function (AMF) to the LTE eNB or 5G gNB in a new Information Element (IE) as part of "Initial context setup" depending on whether the signaling connection is between 5GC and 5G gNB (for example, option 2, 4, 7/7a) or between 5G-CN and LTE eNB (for example, option 5). The 5G gNB or LTE eNB may use the access control information to allow or restrict access of the UE to a particular RAT (for example, 5G NR or E-UTRA) respectively.

The same solution can be applied, as an extension of the same principles, to a UE accessing 5GC via non-3GPP access, such as untrusted WLAN access, trusted WLAN access and/or fixed accesses.

Figure 6:
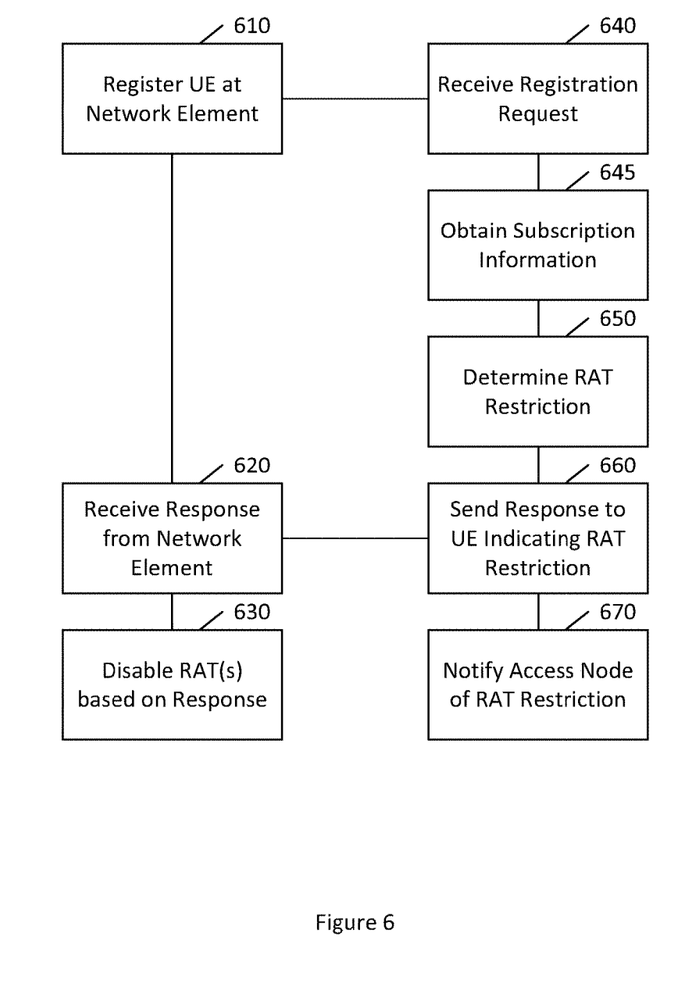
FIG. 6 illustrates a method according to certain embodiments.

FIG. 6 illustrates a method according to certain embodiments. As shown in FIG. 6, a method can include, at 610, registering a user equipment with a network element. The registering can include identifying user equipment capabilities. The capabilities can be provided via S1 or non-access stratum signaling. The capabilities can be capabilities for using a plurality of radio access technologies.

The method can also include, at 620, receiving a response from the network element indicating restriction on use of at least one radio access technology. The network element can be a mobility management entity. The response can be a tracking area update acceptance message or attach acceptance message.

The method can further include, at 630, disabling at least one radio access technology for the user equipment based on the response.

The above features of FIG. 6 may be performed by, for example, a user equipment. However, other features of the method may be performed by other network elements.

For example, the method can also include, at 640, receiving a registration request for a user equipment at a network element, wherein the request can identify user equipment capabilities. This can be a request sent as part of the registering at 610. Thus, the capabilities can be provided via S1 or non-access stratum signaling and the capabilities can be capabilities for using a plurality of radio access technologies, as mentioned above. The network element can be a mobility management entity.

The method can also include, at 650, determining a restriction on use of at least one radio access technology for the user equipment. Moreover, the method can further include one or both of, at 660, sending a response to the user equipment indicating the restriction on use of at least one radio access technology, and, at 670, indicating to an access node that the access node is to impose at least one restriction on serving at least one radio access technology to the user equipment. The access node can be an evolved Node B or a next generation Node B. The response to the user equipment can be a tracking area update acceptance message or attach acceptance message.

The method can also include, at 645, obtaining subscription information regarding the user equipment from a further network element. The further network element can be a home subscriber server or unified data manager.

The restriction on use can be determined at 650 based on the subscription information. Moreover, the restriction on use can be determined at 650 further based on roaming information regarding the user equipment, which may be stored at the network element. The determination at 650 can also be further based on such things as a timer related to use of at least one radio access technology and/or access control validity information related to use of at least one radio access technology.

Figure 7:
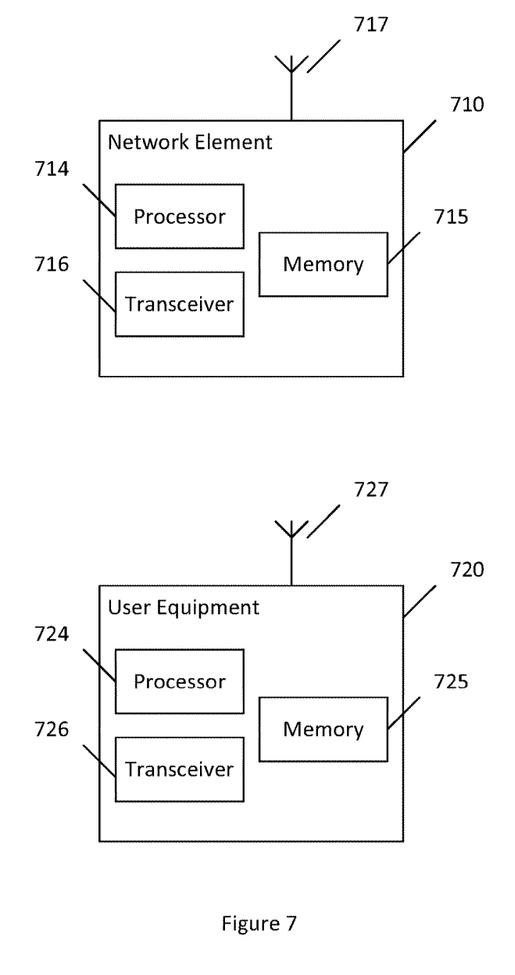
FIG. 7 illustrates a system according to certain embodiments.

FIG. 7 illustrates a system according to certain embodiments of the invention. It should be understood that each block of the flowchart of FIG. 6 may be implemented by various means or their combinations, such as hardware, software, firmware, one or more processors and/or circuitry. In one embodiment, a system may include several devices, such as, for example, network element 710 and user equipment (UE) or user device 720. The system may include more than one UE 720 and more than one network element 710, although only one of each is shown for the purposes of illustration. A network element can be an MME, an access point, a base station, an eNode B (eNB), a gNB, or any other network element, such as any of the network elements shown in FIGS. 1-4.

Each of these devices may include at least one processor or control unit or module, respectively indicated as 714 and 724. At least one memory may be provided in each device, and indicated as 715 and 725, respectively. The memory may include computer program instructions or computer code contained therein, for example for carrying out the embodiments described above. One or more transceiver 716 and 726 may be provided, and each device may also include an antenna, respectively illustrated as 717 and 727. Although only one antenna each is shown, many antennas and multiple antenna elements may be provided to each of the devices. Other configurations of these devices, for example, may be provided. For example, network element 710 and UE 720 may be additionally configured for wired communication, in addition to wireless communication, and in such a case antennas 717 and 727 may illustrate any form of communication hardware, without being limited to merely an antenna.

Transceivers 716 and 726 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 720 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 720 may be a sensor or smart meter, or other device that may usually be configured for a single location.

In an exemplifying embodiment, an apparatus, such as a node or user device, may include means for carrying out embodiments described above in relation to FIG. 6.

Processors 714 and 724 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 715 and 725 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 710 and/or UE 720, to perform any of the processes described above (see, for example, FIG. 6). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 7 illustrates a system including a network element 710 and a UE 720, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may provide a new procedure in EPS for option 3 and in NGS for options 2, 4, 5, 7, which is a clean and future-proof approach. Furthermore, certain embodiments provide at least two ways to enforce RAT (access to NR) restrictions for option 3: prohibiting the eNB from performing DC with NR and disabling NR in the UE.

Similarly, certain embodiments provide at least two methods to enforce RAT (access to NR) and access to NGC restrictions for options 2, 4, 7: providing an appropriate reject cause to stop access to NR/NGC and disabling NR to stop access to NR/NGC.

In addition, certain embodiments provide a special solution for restricting accessing NGC via Option 5 when Option 5 is restricted for accessing NGC: LTE eNB can reject E-UTRAN radio resource control (RRC) or NR RRC request (with NGC NAS) and can redirect the UE to use of E-UTRAN RRC/EPC NAS.

Furthermore, certain embodiments can introduce new information, including a timer, within the network. If this timer expires, the system can allow or disallow connection of the UE to the 5G RAN. Additionally, certain embodiments can introduce new information for access control validity (date, time, and/or duration) can be introduced. If this validity (date, time, and/or duration) information matches, the system can allow or disallow connection of the UE to the 5G RAN.

As another example, the mechanism of certain embodiments may promote efficient network operation. For example, the mechanism of certain embodiments may support efficient operation for option 3*x*.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

List of Abbreviations

3GPP—3rd Generation Partnership Program
5G—5th Generation
5GC/5G-CN—5G Core Network
5G-RAN—5G Radio Access Network
AF—Application Function
AUSF—Access and Mobility Management Function
Authentication Server Function
DC—Dual Connectivity
DN—Data Network
EPC—Evolved Packet Core
EPLMN—Equivalent PLMN
EPS—Evolved Packet System
eMBB—Extreme Mobile Broadband
eNB—enhanced NodeB
gNB/5G NB—5G NodeB
HPLMN—Home PLMN
HSS—Home Subscriber Server
IE—Information Element
IoT—Internet of Things
LTE—Long Term Evolution
M2M—Machine-to-machine
MME—Mobility Management Entity
MTC—Machine Type Communication
mMTC—massive MTC
cMTC—critical MTC
NGS—Next Generation System
NR—New Radio
NSA—Non-standalone
PCF—Policy Control Function
PDN—Packet Data Network
PDU—Packet Data Unit
P-GW—PDN Gateway
PLMN—Public Land Mobile Network
RAT—Radio Access Technology
SA—Standalone
S-GW—Serving Gateway
SMF—Session Management Function
TAU—Tracking Area Update
UDM—Unified Data Management
UE—User Equipment
UPF—User Plane Function
VPLMN—Visited PLMN
WLAN—Wireless Local Area Network

We claim:

1. A user equipment, comprising:
at least one processor; and
at least one memory including computer program code,
wherein the at least one memory and the computer program code is configured to, with the at least one processor, cause the user equipment at least to:
    send an attach request to register the user equipment with a mobile management entity of an evolved packet core network, wherein the attach request comprises user equipment capabilities related to a plurality of radio access technologies including evolved universal terrestrial radio access and 5G new radio;
    receive an attach accept from the mobile management entity, the attach accept comprising an indication of access restriction for the user equipment wherein the access restriction restricts the user equipment from communicating using 5G new radio; and
    operate the user equipment in accordance with the access restriction, by:
        communicating with an enhanced Node B using evolved universal terrestrial radio access.

2. The user equipment of claim 1, wherein the attach request is sent via S1 or non-access stratum signaling.

3. The user equipment of claim 1, wherein the user equipment capabilities related to a plurality of comprise user equipment capabilities for using the plurality of radio access technologies.

4. The user equipment of claim 1, wherein the at least one memory and the computer program code is configured to, with the at least one processor, cause the user equipment at least to disable 5G new radio in a serving network based on the indication.

5. A mobility management entity of an evolved packet core network, the mobility management entity comprising:
at least one processor; and
at least one memory including computer program code,
wherein the at least one memory and the computer program code is configured to, with the at least one processor, cause the mobility management entity at least to
    receive an attach request from a user equipment to register the user equipment with the mobility management entity, wherein the attach request comprises user equipment capabilities related to a plurality of radio access technologies including evolved universal terrestrial radio access and 5G new radio;
    determine an access restriction for the user equipment, wherein the access restriction restricts the user equipment from communicating using 5G new radio;
    send an attach accept to the user equipment, the attach accept comprising an indication of the access restriction for the user equipment; and
    transmit to an enhanced Node B an indication that the enhanced Node B is to not establish dual connectivity with 5G new radio for the user equipment.

6. The mobility management entity of claim 5, wherein the at least one memory and the computer program code is configured to, with the at least one processor, cause the apparatus at least to obtain subscription information regarding the user equipment from a further network element, wherein the access restriction is further determined based on the subscription information.

7. The mobility management entity of claim 5, wherein the access restriction is determined further based on roaming information regarding the user equipment.

8. The mobility management entity of claim 6, wherein the further network element comprises a home subscriber server or unified data manager.

9. The mobility management entity of claim 5, wherein the attach request is sent via S1 or non-access stratum signaling.

10. The mobility management entity of claim 5, wherein the access restriction is further determined based on a timer related to use of the 5G new radio.

11. The mobility management entity of claim 5, wherein the access restriction is further determined based on access control validity information related to use of the 5G new radio.

12. An apparatus for a next generation Node B, the apparatus comprising:
- at least one processor; and
- at least one memory including computer program code,
- wherein the at least one memory and the computer program code is configured to, with the at least one processor, cause the apparatus at least to:
- receive, from a mobility management entity, a context setup message, wherein the context setup message comprises access control information, the access control information restricting access of a user equipment to a radio access technology, wherein the radio access technology is 5G new radio;
- restrict access of the user equipment to 5G new radio based on the access control information; and
- receive further access control information from a enhanced Node B, the further access information causing the next generation Node B to perform data forwarding to the enhanced Node B without transferring the data towards the user equipment directly.

* * * * *